United States Patent [19]

Hirota et al.

[11] Patent Number: 5,514,210
[45] Date of Patent: May 7, 1996

[54] APATITE-ORGANIC MATERIAL COMPLEX AND PROCESS FOR ITS PRODUCTION

[75] Inventors: Kazushi Hirota, Tsukuba; Katsunari Nishihara, Tokyo, both of Japan

[73] Assignee: National Institute for Research in Inorganic Materials, Tsukuba, Japan

[21] Appl. No.: 302,016

[22] Filed: Sep. 9, 1994

[30] Foreign Application Priority Data

Oct. 4, 1993 [JP] Japan .................................. 5-271265

[51] Int. Cl.$^6$ ........................... C09K 3/00; C04B 35/447
[52] U.S. Cl. ........................... 106/35; 106/124; 106/125; 106/287.29; 501/1; 423/305; 264/65; 264/319
[58] Field of Search ......................... 106/35, 124, 125, 106/287.29, 137; 501/1; 423/308, 311, 305; 264/65, 319

[56] References Cited

U.S. PATENT DOCUMENTS

| 4,503,157 | 3/1985 | Harahira | 106/35 |
| 4,516,276 | 5/1985 | Mittelmeier et al. | 623/18 |
| 4,904,257 | 2/1990 | Mori et al. | 106/35 |

*Primary Examiner*—Mark L. Bell
*Assistant Examiner*—Michael Marcheschi
*Attorney, Agent, or Firm*—Oblon, Spivak, McClelland, Maier & Neustadt

[57] ABSTRACT

An apatite-organic material complex comprising an apatite powder having a crystal particle size of at most 0.5 μm, an organic material and from 5 to 40 wt. % of water.

9 Claims, No Drawings

APATITE-ORGANIC MATERIAL COMPLEX AND PROCESS FOR ITS PRODUCTION

BACKGROUND OF THE INVENTION

1. Field of the Invention

The present invention relates to an apatite shaped product useful as an implant material such as an artificial bone or an artificial fang, and a process for its production.

2. Discussion of Background

Bones and teeth of human beings and animals are regarded as being made of apatite complexed with an organic material such as collagen. This apatite can easily be artificially synthesized and will not bring about rejection even when embedded in a vital body. Accordingly, such apatite is presently processed into granules and used as an implant material.

On the other hand, it is known that when apatite is applied in the form of a sintered product to a site where strength is required, the apatite may bond to a bone in a vital body, but when a force is exerted to the bonded portion, a strong stress will be formed at the bonded portion, which will lead to breakage. Therefore, the use is very much limited. This is caused by the fact that the Young's modulus of the sintered product of apatite is about 100 GPa, while the Young's modulus of a bone is as low as at most 20 GPa.

Accordingly, it is desired to modify apatite to be close to a real bone rather than a mere sintered product and to have it complexed with an organic material to lower the Young's modulus. However, this has not been realized before.

SUMMARY OF THE INVENTION

Under these circumstances, it is an object of the present invention to present a technology whereby apatite and an organic material can be complexed to obtain a shaped product having physical properties close to bones of living creatures.

By merely mixing apatite and an organic material, it is impossible to obtain a shaped product having both strength and resilience close to vital bones. Further, apatite has a sintering temperature as high as about 1,200° C., and can not be complexed with an organic material by mere sintering. The present inventors have studied a possibility of substantially lowering the sintering temperature and as a result, have surprisingly found that if water is present during sintering of apatite, the sintering proceeds at a lower temperature and further that if a pressure is exerted during sintering of apatite, the sintering proceeds at a lower temperature. It has been further found that by such a method, a product will have a structure wherein fine crystals of apatite having a particle size of about 100 nm are in direct contact with a high molecular weight material such as collagen, and such a product is insoluble in water and capable of maintaining both the strength and the resiliency. The present invention has been accomplished on the basis of these discoveries.

Thus, the present invention provides an apatite-organic material complex comprising an apatite powder having a crystal particle size of at most 0.5 μm, an organic material and from 5 to 40 wt. % of water.

The present invention also provides a process for producing an apatite-organic material complex, which comprises incorporating from 5 to 40 wt. % of water to a powder composition comprising an apatite powder having a crystal particle size of at most 0.5 μm and an organic material, and exerting a pressure of at least 50 MPa to the resulting mixture while maintaining the temperature within a range of from 0° to 200° C., to form a shaped product.

DETAILED DESCRIPTION OF THE PREFERRED EMBODIMENTS

Now, the present invention will be described in detail.

By merely mixing apatite and an organic material, it is impossible to obtain a shaped product having both strength and resiliency close to vital bones. This is due to the fact that even if a vital high molecular weight organic material such as collagen and an apatite powder are mixed, such a mixture will undergo swelling when immersed in water and will eventually dissolve in water.

Accordingly, it is conceivable to mix e.g. collagen to apatite cement, followed by solidification, or to firstly sinter apatite to obtain a porous product and then impregnate an organic material thereto to obtain a complex. However, with a complex produced by such impregnation, no adequate resiliency is observed, and only a weak product can be obtained.

Therefore, it is at least necessary to process apatite in the presence of an organic material. However, apatite has a sintering temperature as high as about 1,200° C., and can not be complexed with an organic material by mere sintering, as mentioned above.

Whereas, it is a feature of the present invention to have water present and to exert a pressure at the time of sintering apatite, as a means to substantially lower the sintering temperature. It is thereby possible to let the sintering proceed at a lower temperature. Especially when a pressure is exerted to an apatite powder containing liquid water, the apatite powder will solidify even at room temperature to form a shaped product similar to apatite sintered at a high temperature. Accordingly, when apatite and an organic material are preliminarily complexed, and a pressure is exerted thereto in the presence of water, a shaped product of apatite complexed with the organic material, can be obtained.

Specifically, from 5 to 40 wt. % of water is incorporated to a powder composition comprising an organic material and an apatite powder having a crystal particle size of at most 0.5 μm, and a pressure of at least 50 MPa is exerted to the mixture while maintaining the temperature within a range of from 0° to 200° C.

By such a process, it is possible to produce a complex having a structure wherein individual apatite crystal particles and the vital organic high molecular weight material are in direct contact with each other. The contact area between the apatite and the organic molecules is expected to increase approximately at the inverse square of the average particle size of apatite crystals. It has been found that when apatite crystal particles are very fine, and as a result, the contact area with the organic molecules exceeds a certain threshold value, the physical properties of the complex will be governed by this contact area, and resiliency specific to vital bones will be obtained.

Accordingly, in the present invention, very fine apatite having a particle size of at most 0.5 μm is employed, whereby the contact area between the apatite and the organic molecules will be sufficiently large, whereby resiliency close to vital bones will be obtained.

The organic material is preferably a high molecular weight organic material having a molecular weight of at least 10,000, preferably at least a few tens thousands. For example, polysaccharides or scleroproteins may be mentioned. The blend ratio of the organic material and the apatite is suitably determined in view of the desired resiliency and strength.

Usually, however, in the complex, the apatite powder is in an amount of from 40 to 90 wt. %, preferably from 50 to 80, and the organic material is in an amount of from 1 to 40 wt. %, preferably from 3 to 30 wt. %.

Water to be present together with the apatite, is required to be impregnated in the apatite-organic material complex. For this purpose, at least 5 wt. % of water is necessary. However, if water exceeds 40 wt. %, the strength of the resulting complex tends to be low, such being undesirable.

With respect to processing conditions, the pressure is at least 50 MPa, and the temperature is from 0° to 200° C. If the pressure is less than 50 MPa, the progress of densifying tends to be slow, and the strength of the resulting densified product tends to be weak, such being undesirable. The temperature may be at room temperature, but if the temperature is lower than 0° C. water tends to freeze, whereby densifying will not proceed. On the other hand, if it exceeds 200° C. the organic material to be complexed, tends to undergo a property change or decomposition, such being undesirable.

Now, the present invention will be described in further detail with reference to an Example. However, it should be understood that the present invention is by no means restricted by such a specific Example.

EXAMPLE 500 g of a commercially available collagen solution (concentration: 2 wt. %, isoelectric point: 9.5, pH: 3) was diluted with 8 l of pure water, and 0.6 mol of phosphoric acid was added thereto to obtain a mixed solution. Separately, 1 mol of calcium carbonate was maintained at 900° C. in air for 10 hours to obtain calcium oxide, which was pulverized in a mortar into a fine powder and then put into 3 l of pure water to obtain a suspension of calcium hydroxide.

While stirring the suspension of calcium hydroxide vigorously, the above collagen-phosphoric acid mixed solution was gradually added thereto. Upon completion of the addition, formed precipitates were collected by filtration and dried to a water content of 31 wt. %. The product was sealed in an evacuated metal capsule and maintained at 40° C. under 200 MPa for 8 hours. The apatite-collagen complex thus obtained had a density of 1.75 g/ml, a Young's modulus of 2 GPa and a compressive strength of 6.5 MPa.

Further, similar treatment was carried out by changing the blend ratio of the apatite and the collagen, whereby it was confirmed that with a decrease of the blend ratio of collagen, the Young's modulus increased up to 100 GPa, and the compressive strength increased up to 30 MPa, which indicates that with a decrease of the blend ratio of collagen, the product tended to be hard and brittle.

The test piece obtained by the above Example had a Young's modulus of 2 GPa, which is substantially low as compared with the sintered product of apatite. The Young's modulus can be adjusted at an optional level within a range of from 2 GPa to 100 MPa by changing the blend ratio of the apatite and the collagen, whereby an implant material can be designed and produced to meet the Young's modulus of the bone which may differ depending upon the particular site.

As described in detail in the foregoing, with the apatite-organic material complex of the present invention, it is possible to present an implant material which can easily be bonded and adapted to vital bones. In such a case, the Young's modulus of vital bones is at most 20 GPa, whereas the Young's modulus can be adjusted to an optional level within a range of from 2 GPa to 100 MPa. Therefore, the Young's modulus can be adjusted to any Young's modulus of a bone, which may vary depending upon the particular site, whereby it is possible to present an implant material which has good affinity to a vital body and which is capable of minimizing the pain to a patient. Thus, the effects of the present invention are remarkable.

What is claimed is:

1. A shaped pressure-densified apatite-organic material complex comprising an apatite powder having a crystal particle size of at most 0.5 µm, an organic material and from 5 to 40 wt. % of water.

2. The apatite-organic material complex according to claim 1, wherein the organic material is a high-molecular weight organic material having a molecular weight of at least 10,000.

3. The apatite-organic material complex according to claim 1, wherein the organic material is collagen.

4. The apatite-organic material complex according to claim 1, wherein the apatite powder is in an amount of from 40 to 90 wt. %, and the organic material is in an amount of from 1 to 40 wt. %.

5. A process for producing an apatite-organic material complex, which comprises incorporating from 5 to 40 wt. % of water to a powder composition comprising an apatite powder having a crystal particle size of at most 0.5 µm and an organic material, and exerting a pressure of at least 40 MPa to the resulting mixture while maintaining the temperature within a range of from 0° to 200° C., to form a shaped product.

6. The process according to claim 5, wherein the organic material is a high molecular weight organic material having a molecular weight of at least 10,000.

7. The shaped apatite-organic material product produced by the process of claim 5.

8. The shaped pressure-densified apatite-organic material complex of claim 1 where the organic material is water swellable.

9. The shaped pressure-densified apatite organic material complex of claim 4 where the high molecular weight organic material is water swellable.

* * * * *